United States Patent

Allison et al.

[15] 3,681,624

[45] Aug. 1, 1972

[54] UNIJUNCTION TRANSISTOR CIRCUIT WITH IMPROVED RECOVERY

[72] Inventors: Arthur F. Allison, West Bend; Donald J. Greening, Thiensville; Anton N. Mollgaard, Pewaukee, all of Wis.

[73] Assignee: Cutler-Hammer, Inc., Milwaukee, Wis.

[22] Filed: Dec. 17, 1970

[21] Appl. No.: 98,998

[52] U.S. Cl. ....................307/301, 307/283, 331/111

[51] Int. Cl. ............................................H03k 19/08

[58] Field of Search...307/283, 301, 318; 323/22 SC; 331/111

[56] References Cited

UNITED STATES PATENTS 3,480,801 11/1969 Smith........................307/283 X
3,378,702 4/1968 Burke........................307/301 X
3,146,392 8/1964 Sylvan........................307/318 X
3,206,612 9/1965 Swanekamp et al. ......307/283 X
3,289,071 11/1966 Rosenberry, Jr...........307/301 X
3,307,093 2/1967 Wright........................307/301 X
3,504,269 3/1970 Hallahan, Jr. ..........323/22 SC X

*Primary Examiner*—Stanley D. Miller, Jr.
*Assistant Examiner*—R. C. Woodbridge
*Attorney*—Hugh R. Rather and William A. Autio

[57] ABSTRACT

A negative resistance circuit such as a pulse-forming or relaxation oscillator circuit employing a unijunction transistor as the negative resistance element and adapted for firing an SCR or the like. The tendency of the negative resistance element to fail to recover to non-conducting condition after it has been triggered into conduction, due to a low valley current characteristic, is overcome by an improved recovery circuit that uses the interbase current to reduce the input current.

10 Claims, 2 Drawing Figures

UNIJUNCTION TRANSISTOR CIRCUIT WITH IMPROVED RECOVERY

BACKGROUND OF THE INVENTION

Negative resistance circuits of the pulse-forming or relaxation oscillator type employing a unijunction transistor (UJT) have been known heretofore. In a typical circuit of this type, the interbase voltage is supplied from a D.C. source through respective resistors. The emitter voltage is periodically formed by an RC circuit that is controlled by a constant current input circuit such as a transistor circuit or the like thereby to cause the UJT to provide output pulses.

Due to variations in the characteristics of UJT's such as low valley current characteristic, for example, difficulties have been encountered in failure of a UJT to recover its non-conducting condition after it has been triggered into conduction. While this problem has been overcome to some extent by selecting UJT's with the desired characteristic with the attendant higher cost, this invention relates to improvements thereover.

SUMMARY OF THE INVENTION

This invention relates to providing a negative resistance characteristic circuit with improved recovery circuit means thereby allowing use of common, low cost negative resistance characteristic elements or UJT's.

An object of the invention is to provide a negative resistance characteristic circuit with improved recovery means.

A more specific object of the invention is to provide a UJT circuit with improved recovery circuit means.

Another specific object of the invention is to provide improved, low cost recovery circuit means for a negative resistance characteristic circuit whereby to eliminate the need for selecting negative resistance elements of uniform desired characteristics.

Other objects and advantages of the invention will hereinafter appear.

DESCRIPTION OF THE PREFERRED EMBODIMENT

Figure 1:
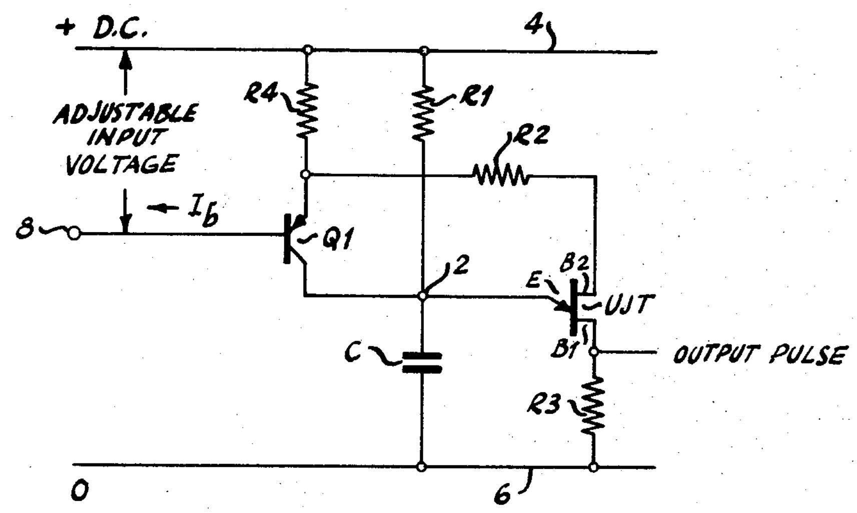
FIG. 1 is a schematic diagram of a unijunction transistor circuit with improved recovery constructed in accordance with the invention.

Referring to FIG. 1, there is shown a unijunction transistor UJT having its emitter E connected to a junction 2 between a resistor R1 and a capacitor C that are connected in series across a D.C. source (full-wave rectified A.C.) represented by positive voltage conductor 4 and zero voltage or ground conductor 6, resistor R1 of this series circuit being connected to the positive side. Base B2 of the UJT is connected to a resistor R2 and base B1 is connected through a resistor R3 to ground or common conductor 6. The output of the circuit is taken from the junction between base B1 and resistor R3 as shown in FIG. 1.

The other side of base B2 resistor R2 is supplied through a resistor R4 instead of directly from positive conductor 4 for improved recovery purposes as hereinafter described in more detail.

The UJT is provided with an adjustable current input circuit. This circuit comprises a transistor Q1 of the P-N-P conductivity type or the like having its emitter supplied from positive conductor 4 through resistor R4 and having its collector connected to junction 2. The base of transistor Q1 is connected to input terminal 8.

As will be apparent from FIG. 1, an input signal such as a constant but adjustable D.C. voltage derived from the same full-wave rectified source is applied between input terminal 8 and the positive side of the source. The voltage applied to input terminal 8 is less positive than the source voltage and thereby biases the emitter-base circuit of transistor Q1 positive to cause base current Ib to flow. This causes transistor Q1 to conduct whereby current flows from the D.C. source through resistor R4 and the emitter-collector circuit of transistor Q1 into capacitor C to charge this capacitor on each half-cycle of the rectified source voltage.

Minimum charging current flows through resistor R1 into capacitor C. That is, the value of resistor R1 may be selected so that the capacitor voltage will reach the UJT emitter peak point, shown in FIG. 2, at or near the end of each rectified half-cycle of source voltage. Input transistor Q1 is then used to supply additional current to the capacitor to advance the firing angle of the UJT.

Figure 2:
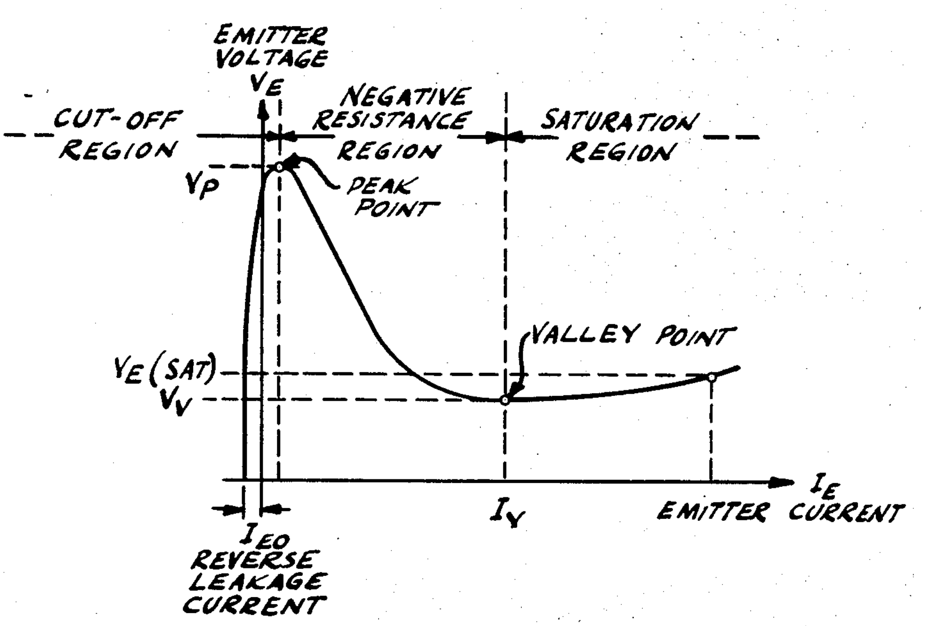
FIG. 2 graphically depicts operating characteristics of a unijunction transistor.

The manner in which the negative resistance characteristic UJT functions is shown in FIG. 2. In order that the UJT will provide output pulses, it must be triggered into conduction at some time during each half-cycle of the source voltage and then allowed to recover to its non-conducting condition so that it can be fired into conduction again on the next half-cycle.

While a rectified unfiltered source is required if the UJT operation is to be synchronized with silicon controlled rectifier (SCR) operation or the like, a constant D.C. source could as well be used for the circuit of FIG. 1 in other applications such as relaxation oscillator operation, for example.

In FIG. 1, when capacitor C charges to the peak point value shown in FIG. 2 and this voltage is applied to the emitter of the UJT, there is a sudden decrease in the resistance between the emitter and base B1 causing the emitter current to increase and the emitter voltage to decrease as shown by the downward slope, negative resistance region, of the curve in FIG. 2. This current flows through resistor R3 to provide an output pulse.

At first the UJT conducts in its saturation region shown in FIG. 2. Then as the capacitor voltage decreases, the capacitor discharge current also decreases. Consequently, the emitter current decreases along the right-hand portion of the curve in FIG. 2. When this emitter current decreases to or past the valley point, the emitter voltage having decreased below the peak point, the UJT snaps back to its cut-off region shown at the left portion of FIG. 2 to some point of the curve toward the left of the peak point. In this manner, the UJT recovers its non-conducting condition after the output pulse has been formed.

Some UJT's have trouble regaining their non-conducting condition. This may be due to variations in their characteristics, as for example, a low valley current characteristic. This might occur in the conventional circuit where the base B2 resistor R2 is connected directly to the positive supply conductor. In such prior art circuit, since the input signal would continue to be applied, the input current that continues to flow to the emitter of the UJT through transistor Q1 and resistor R1 might be sufficient to prevent the UJT from recovering.

To overcome this problem in a very simple and economical manner, the base B2 resistor R2 has been connected to the junction between resistor R4 and the emitter of transistor Q1. This circuit takes advantage of the face that when the UJT is triggered into emitter-base B1 conduction, its base B2 current increases. Referring to FIG. 1, it will be apparent that when the UJT is rendered conducting, the increased current flow through resistors R4 and R2, base B2 and base B1, and resistor R3 causes the emitter voltage of transistor Q1 to decrease. This emitter voltage is reduced by an amount proportional to the added voltage drop in resistor R4 due to the increased base B2 current. This will have the effect of turning transistor Q1 down or off depending upon the component values. As a result, the reduction in input current reduces the emitter current of the UJT. It is of course desirable that this emitter current be reduced below the valley point shown in FIG. 2 to insure that the UJT will always quickly recover its non-conducting condition after it has been triggered into condition by the capacitor voltage.

The valve of resistor R4 may be selected to serve another useful purpose in addition to the improved recovery function. That is to progressively decrease the size of the input signal increments that are required to obtain uniform advancements in the output pulse angle on each half-cycle when the signal is turned up when a rectified source is used. When a constant D.C. supply is used, this will progressively decrease the size of the input signal increments that are required to obtain uniform increases in the frequency of the output pulses.

To this end, it will be apparent that when the input signal is turned up or increased, the current through the emitter-collector circuit of transistor Q1 will increase. Since this current also flows through resistor R4, the voltage drop on this resistor will increase thereby decreasing the interbase voltage on the UJT. Since the peak point emitter voltage is a fixed fractions of the applied interbase voltage, this will allow the UJT to be triggered at a lower peak point emitter voltage. This reduces the input signal range requirements for full range operation of the unijunction transistor.

While the apparatus hereinbefore described is effectively adapted to fulfill the objects stated, it is to be understood that the invention is not intended to be confined to the particular preferred embodiment of unijunction transistor circuit with improved recovery disclosed, inasmuch as it is susceptible of various modifications without departing from the scope of the appended claims.

We claim:

1. A pulse generating circuit operable by an input signal for providing an output pulse comprising:
- and electrical voltage source;
- input signal control means supplied with voltage from said source and being operable by an input signal for proving a control signal;
- trigger voltage developing means responsive to said control signal for developing a triggering voltage;
- a negative resistance device;
- a circuit means connected through a portion of said input signal control means to said source for applying a supply voltage to said negative resistance device, said negative resistance device being responsive to said triggering voltage to become operative and characterized by a sudden decrease in resistance and an accompanying current flow therethrough to provide an output pulse;
- an improved recovery means in said circuit means for lowering said control signal when said negative resistance device is rendered operative to allow the latter to recover its inoperative state.

2. The invention defined in claim 1, wherein said improved recovery means comprises:
- a resistor through which said supply voltages are applied to both said negative resistance device and said input signal control nears whereby increased current flow through said resistor due to operation of said negative resistance device causes a voltage drop to reduce the control signal provided by said input signal control means.

3. The invention defined in claim 2, wherein said negative resistance device comprises:
- a unijunction transistor having its interbase voltage supplied through said resistor and having its emitter connected to said trigger voltage developing means.

4. The invention defined in claim 3, wherein:
- said resistor performs the additional function of lowering the interbase voltage on said unijunction transistor as a function of increase in the input signal thereby to correspondingly lower the emitter voltage at which said unijunction transistor is triggered into conduction.

5. The invention defined in claim 2, wherein said input signal control means comprises:
- a transistor having its emitter supplied through said resistor and its collector connected to said trigger voltage developing means to provide a controlled value of current to the latter as said control signal, and having the input signal applied across its emitter-base circuit and said resistor.

6. The invention defined in claim 5, wherein said trigger voltage developing means comprises;
- an RC circuit including a capacitor that is charged by said controlled value of current to develop an increasing voltage for triggering said negative resistance device.

7. A pulse generating circuit operable by an input signal for providing an output pulse comprising:
- an electrical voltage source;
- a negative resistance element;
- circuit means connected to said source for applying a supply voltage to said negative resistance element;
- trigger voltage developing means for rendering said negative resistance element operative at a controllable time after the application of a control current whereby said negative resistance element is characterized by a sudden decrease in resistance and current flow therethrough to provide an output pulse;
- input signal control means supplied from said source and being responsive to an adjustable input signal to provide a control current for operation of said trigger voltage developing means so as to cause it to render said negative resistance element operative as aforesaid, and adjustment of said input signal varying the time of operation of said negative resistance element;

and improved recovery means in said circuit means for reducing said control current when said negative resistance element is rendered operative although said input signal continues to be applied to allow said negative resistance element to recover its inoperative condition and to terminate the output pulse.

8. The invention defined in claim 7, wherein said improved recovery means comprises:

an impedance through which supply voltage is applied to both said negative resistance elements and said input signal control means so that increase in the input signal reduces the supply voltage to said negative resistance element and triggering of the latter reduces said control current provided by said input signal control means.

9. A negative resistance circuit with improved recovery means comprising:

a solid state negative resistance device having a pair of main terminals and a control terminal and being characterized by an operation including a sudden decrease in resistance accompanied by an increase in current flow at one of its main terminals when the voltage at its control terminal is increased to a predetermined value, said predetermined value being a function of the voltage applied across its main terminals;

an electrical voltage source;

trigger voltage developing means connected to said control terminal;

input signal control means operable by an adjustable input signal for providing a control signal to said trigger voltage developing means to cause operation thereof to provide a voltage increasing to said predetermined value;

circuit means connected to said source for providing supply voltage to both said input signal control means and said solid state negative resistance device;

and said circuit means comprising means responsive to operation of said solid state negative resistance device for lowering said control signal to allow the latter to recover its inoperative state.

10. The invention defined in claim 9, wherein said means responsive to operation of said solid state negative resistance device for lowering said control signal to allow the latter to recover its inoperative state comprises:

means responsive to increase in the input signal for lowering the supply voltage applied to said solid state negative resistance device to afford triggering thereof at a lower trigger voltage.

* * * * *

PO-1050
(5/69)

UNITED STATES PATENT OFFICE
CERTIFICATE OF CORRECTION

Patent No. 3,681,624 Dated August 1, 1972

Inventor(s) Arthur F. Allison, Donald J. Greening & Anton N. Mollgaard

It is certified that error appears in the above-identified patent and that said Letters Patent are hereby corrected as shown below:

Column 3, line 8, "face" should read --fact--;
line 25, "condition" should read --conduction--;
line 62, "proving" should read --providing--.

Column 4, line 16, "nears" should read --means--.

Signed and sealed this 23rd day of January 1973.

(SEAL)
Attest:

EDWARD M.FLETCHER,JR.
Attesting Officer

ROBERT GOTTSCHALK
Commissioner of Patents